United States Patent
O'Hare et al.

(10) Patent No.: US 6,970,959 B1
(45) Date of Patent: Nov. 29, 2005

(54) MULTI-EXECUTE SYSTEM CALLS

(75) Inventors: Jeremy O'Hare, Hopkinton, MA (US);
Dan Arnon, Boston, MA (US); Mark Halstead, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 954 days.

(21) Appl. No.: 09/867,136

(22) Filed: May 29, 2001

Related U.S. Application Data

(63) Continuation-in-part of application No. 09/591,827, filed on Jun. 12, 2000, now Pat. No. 6,697,367.

(51) Int. Cl.[7] .............................................. G06F 13/00
(52) U.S. Cl. ...................... 710/74; 712/22; 709/221; 711/154
(58) Field of Search ................................ 710/5, 62, 74, 710/72; 712/22; 711/154, 162, 100; 709/221

(56) References Cited

U.S. PATENT DOCUMENTS

| | | | |
|---|---|---|---|
| 5,155,845 A | * | 10/1992 | Beal et al. ..................... 714/6 |
| 5,517,665 A | * | 5/1996 | Sprague et al. ................ 712/9 |
| 6,098,129 A | * | 8/2000 | Fukuzawa et al. ............ 710/65 |
| 2002/0120664 A1 | * | 8/2002 | Horn et al. ................ 709/107 |

* cited by examiner

*Primary Examiner*—Kim Huynh
(74) *Attorney, Agent, or Firm*—Choate, Hall & Stewart LLP

(57) ABSTRACT

A computer system may include one or more hosts and a plurality of data storage devices for providing multihop system calls. The data storage devices are interconnected and also connected to the one or more hosts. The connections may be direct or indirect. Each data storage device classifies a data operation as a system call, a remote system call, or a multihop system call. If an operation is classified as a multihop system call by a first data storage device, a portion of the data associated with the multihop system call is removed and a second portion of the data is forwarded to a second data storage device as specified by a connection identifier included in the first portion. A multi-execute command may be issued by a host system causing one or more commands to be executed on one or more processors at points in a communication path in a forward and/or reverse direction when traversing the communication path.

27 Claims, 11 Drawing Sheets

|       | C1 | C2 | total hops | this_hop_count | this_hop_node |
|-------|----|----|------------|----------------|---------------|
| 220a  | 0  | 0  | 0          | 0              | 0             |
| 220b  | 0  | 0  | 1          | 1              | 1             |
| 220c  | 0  | 0  | 2          | 2              | 2             |
| 220d  | 0  | 0  | 3          | 3              | 3             |
| 220e  | 1  | 1  | 8          | 8              | 8             |
| 220f  | 1  | 1  | 9          | 9              | 7             |
| 220g  | 1  | 1  | ...        | ...            | 6             |
| 220h  | 1  | 1  | 16         | 16             | 0             |

FIGURE 11

MULTI-EXECUTE SYSTEM CALLS

CROSS REFERENCE TO RELATED APPLICATIONS

This application is a continuation-in-part of U.S. patent application Ser. No. 09/591,827, filed on Jun. 12, 2000 entitled "MULTIHOP SYSTEM CALLS", now U.S. Pat. No. 6,697,367.

BACKGROUND OF THE INVENTION

1. Technical Field

This application relates generally to computer systems, and more particularly to performing remote system calls in a computer system.

2. Description of Related Art

Computer systems may include different resources that may be used by one or more processors. Resources and processors in a computer system may be interconnected by one or more communication connections. These resources may include, for example, data storage devices such as the Symmetrix™ family of data storage systems manufactured by EMC Corporation. These data storage systems may be coupled to one or more processors and provide storage services to each processor. An example data storage system may include one or more data storage devices, such as those of the Symmetrix™ family, that are connected together and may be used to provide common data storage for one or more processors in a computer system.

A processor may perform a variety of data processing tasks and operations using the data storage system. For example, a processor may perform basic system I/O operations, such as data read and write operations and also administrative tasks, such as data backup and mirroring operations. In performing any one of the foregoing operations, the processor may use one or more system calls in which the processor making the system call instructs a data storage device to perform a particular operation.

In some data storage device arrangements, a first data storage device may be connected to a second data storage device and a processor, such as a host system, may only be able to send commands to the second data storage device indirectly using the first data storage device. In other words, the processor only has a direct connection to the first data storage device, and an indirect connection to the second data storage device. If the processor wishes to instruct the second data storage device to perform a data operation, the processor may use a remote system call using the first data storage device. The processor may issue a remote procedure call to the first data storage device which instructs the second data storage device to perform a data operation, for example.

A problem may exist in a data storage device arrangement that includes another level of indirect data storage devices. For example, in addition to the previously described data storage device arrangement of a first and a second data storage devices, a third data storage device may be connected to the second data storage device. In some applications, a processor may need to instruct the third data storage device to perform data operations. If the processor has a direct connection only to the first data storage device, remote system calls may be used to instruct the second data storage device to perform data operations, and system calls may be used to instruct the first data storage device to perform data operations. However, in the foregoing arrangement for the processor to instruct the third data storage device to perform a data operation may require such instructions pass through an indirect connection of the first and second data storage devices. There is no way for the processor to so instruct the third data storage device using system calls or remote procedure calls due to the additional storage device layering in the data storage device arrangement. Generally, similar problems may exist in data storage device arrangements that also include more than the foregoing three levels of indirect data storage device access from a processor.

Additionally, in a data storage arrangement using indirect connections to perform data operations, coordination problems may exist. Referring to FIG. 6, shown is an example of a system 100 in which host system 102 may perform a backup of data to the backup data storage entity 106. In this example, there is no direct connection between the host 102 and the backup data storage entity 106. To perform the backup operation, commands may be executed by the backup data storage entity 106 as issued by the host system 102 indirectly through data storage entity 104. There may exist the problem of performing coordination of backup activities by the data storage entity 104, such as may be performed by a Symmetrix™ system. For example, the host 102 may issue a command to the data storage entity 104 to begin backup operations. The data storage entity 104 instructs the backup entity 106 to start tapes for backing up data. The data storage entity 104 sends the data to be backed up to the entity 106 and also reports back to the host that the backup has started, such as in connection with a remote procedure call return.

Thus, it may be advantageous to provide an efficient technique for one or more processors to execute a command in which the processors may be indirectly connected in a data storage arrangement, and in particular, in a data storage arrangement that includes three or more levels of indirect data storage device access.

SUMMARY OF THE INVENTION

In accordance with one aspect of the invention is a method executed in a computer system for performing an operation on a plurality of processors. A multi-execute command is issued by a host system to a first processor in a first data storage entity connected to the host system. It is determined whether the first processor is to perform a first operation associated with the multi-execute command. The multi-execute command is forwarded to a second processor in a second data storage entity. It is determined whether the second processor is to perform the first operation associated with said multi-execute command.

In accordance with another aspect of the invention is a computer program product for performing an operation on a plurality of processors. Machine executable code is included for: issuing a multi-execute command by a host system to a first processor in a first data storage entity connected to the host system, determining whether the first processor is to perform a first operation associated with the multi-execute command, forwarding the multi-execute command forwarded to a second processor in a second data storage entity, and determining whether the second processor is to perform the first operation associated with the multi-execute command.

BRIEF DESCRIPTION OF THE DRAWINGS

Features and advantages of the present invention will become more apparent from the following detailed description of exemplary embodiments thereof taken in conjunction with the accompanying drawings in which:

FIG. 11 is a representation of an embodiment data that may be associated with a multi-execute system call.

DETAILED DESCRIPTION OF VARIOUS EMBODIMENTS

Described in U.S. patent Ser. No. 09/064,588, filed on Apr. 22, 1998 (pending), entitled "UNIFIED PROGRAMMING INTERFACE", herein incorporated by reference, is a technique of providing a unified interface to a data storage system allowing different host processors to access the data storage system without requiring the host processor to have knowledge as to the memory configuration, such as where internal control data structures are physically located.

Figure 1:
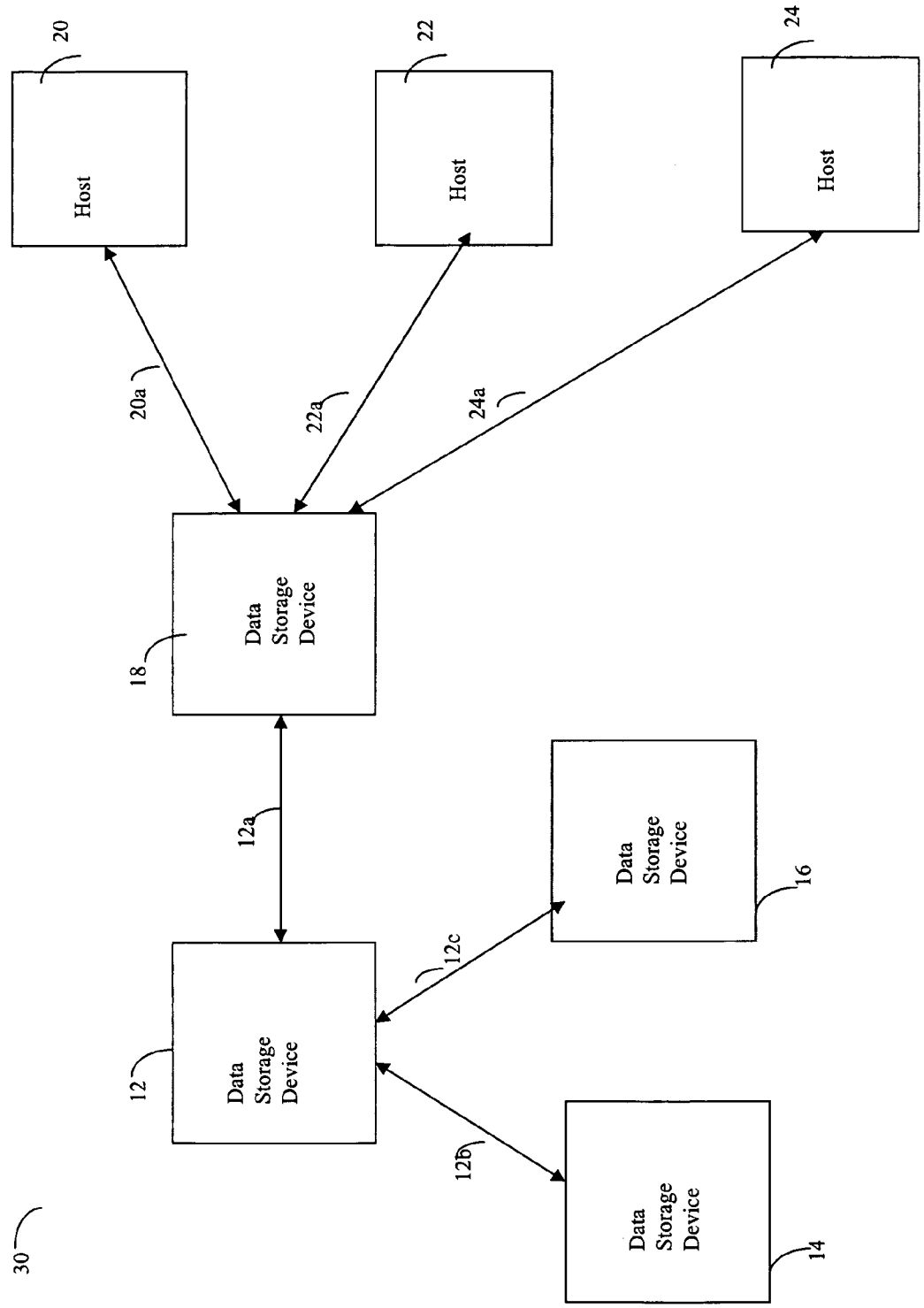
FIG. 1 is an example of an embodiment of a computer system according to the present invention.

Referring now to FIG. 1, shown is an example of an embodiment of a computer system that employs the multi-hop technique described herein. Included in the computer system 30 are N host computers, 20, 22, and 24 which may be, for example, host computers included in the computer system 30. The host computers 20, 22, and 24 may all be located at the same site or may be located in different areas. Also included in the computer system 30 are multiple data storage devices 12, 14, 16, and 18. Each of the data storage devices 12, 14, 16, and 18 may be any one of a variety of data storage devices, such as products provided by EMC Corporation of Hopkinton, Mass. Each of the N host computers 20, 22, and 24 may be, for example, any one of a variety of commercially available single or multi-processor computers including, for example, a personal computer or mainframe computer, such as an IBM mainframe or SUN Sparcstation. Communication is provided using any one of a variety of communication protocols, such as SCSI, ESCON, or Fiber Channel, through connections 12a, 12b, 12c, 20a, 22a, and 24a. Note some or all of connections 12a, 12b, 12c, 20a, 22a, 24a, may pass through other communication devices such as a Connectrix or any other switching equipment that may exist on the way, including a phone line, a repeater, a multiplexer or even a satellite. However, the other communication devices just act as blind transport media for purposes of the discussion herein.

Different types of data operations may be performed in accordance with different types of administrative tasks. In the embodiment of FIG. 1, any one of the host computers 20, 22 or 24 may issue a system call to the data storage device 18 to perform a data operation on the data storage device 18. Additionally, an application, for example, executing on a host computer 20 performing a backup, mirroring, or other administrative operation, may need to have one or more of the data storage devices 12, 14 and/or 16 perform a data operation. The plurality of interconnected storage devices 12, 14, 16, and 18 may be accessed by any one of the host computers 20, 22, and 24 indirectly through the data storage device 18. For example, the host computer 20 may issue a system call to the data storage device 18 to perform a read operation, a write operation or other type of data operation. A system call may be described as a call directed to a data storage device to perform a data operation that is a distance of one level from the host computer initiating the system call.

Additionally, one of the host computers, such as the computer 20, may instruct data storage device 12 to perform a data operation indirectly through data storage device 18 by using a remote system call. With a remote system call, the host computer may issue a request to the data storage device 18 which, in turn, subsequently issues a remote system call using the connection 12a to the data storage device 12 to perform a particular data operation, such to read or write data. A remote system call is a call directed to a data storage device to perform a data operation that is a distance of two levels from the host computer initiating the system call.

In yet another example of performing a data operation, one of the host computers, such as the computer 20, may desire to issue a command to either the device 14 or the device 16. The host computer 20 may indirectly issue a command to a data storage device, such as the device 14, using the data storage devices 12 and 18 as a "pass through" or indirect connection to the data storage device 14 or the device 16. This may be done by the host computer 20 issuing a multihop system call. Generally, a multihop system call may be described as a call directed to a data storage device to perform a data operation that is a distance of three or more levels from the host computer initiating the call. Multihop system calls are described in more detail elsewhere herein.

It should be noted that in the illustrated embodiment, the connections between any two data storage devices, such as the device 12 and the device 18 connected via the connection 12a, may be identified by one or more connection identifiers rather than a machine identifier. In other words, when a host computer 20 issues a command directed for the target device 12, the connection between each of the devices 12, 18 may be identified by a connection identifier rather than identifying a target data storage device, such as the device 12, in the call. This is described in more detail elsewhere herein. Additionally, it may be generalized in the illustrated embodiment where each of the data storage devices 12, 14, 16, and 18 have interconnections defined between them. A connection between any two data storage devices, such as the connection 12a, or a connection from a computer to a data storage device, such as the connection 20a, may be identified through a connection identifier rather than using machine identifiers associated with a data storage device or computer. In other words, when a host computer, such as 20, directs a data storage device, such as the device 14, to perform a data operation, the host computer 20 may use one or more connection identifiers to specify a path from the host computer 20 to the target data device 14. The host computer 20 may identify a first connection identifier from host computer 20 to data storage device 18, a second connection identifier between data storage devices 18 and 12, and a third connection identifier between data storage devices 12 and 14. These connection identifiers may be specified, for example, in a multihop system call. Alternatively, a multihop system call may specify the systems used for the multihop path or, in some embodiments, use only an identifier for the end system or the end connection. However, specifying all of the intermediate connections or systems allows each system handling the call to have only local knowledge (i.e., to not have to be aware of the entire system and the topology thereof).

Figure 2:
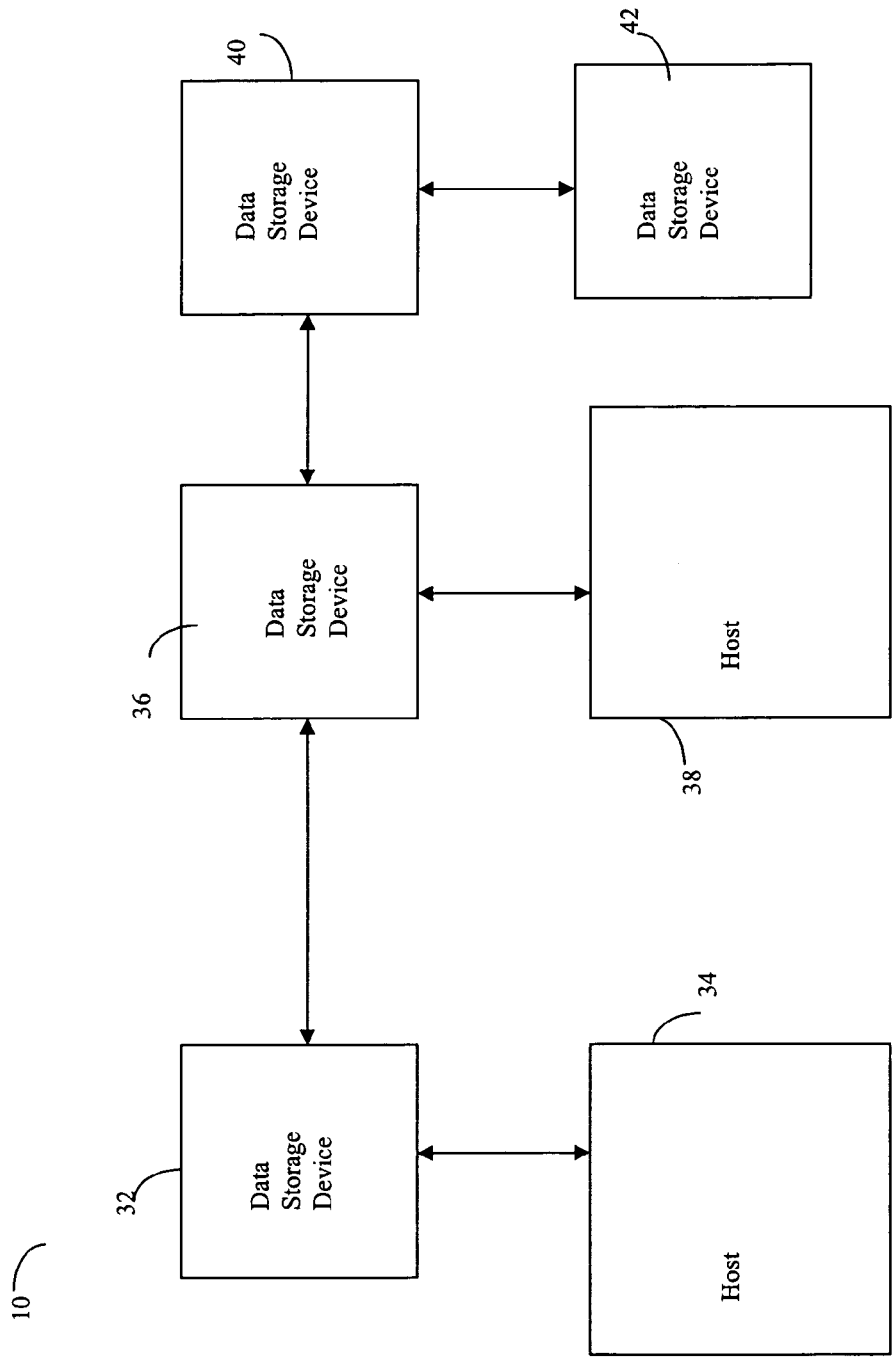
FIG. 2 is an example of another embodiment of computer system according to the present invention.

Referring now to FIG. 2, shown is an example of another embodiment of a computer system that uses the multihop technique disclosed herein. The computer system 10 includes two host computers 34, 38 and multiple storage devices 32, 36, 40, and 42 that are interconnected. Additionally, there is a direct connection between the host 34 and the data storage device 32 as well a direct connection between the host 38 and the data storage device 36. It should be noted that each of the data storage devices 32, 36, 40, and 42 are similar to the data storage devices described in conjunction with FIG. 1 and elsewhere herein. Similarly, each of the host 34 and 38 are similar to hosts 20, 22, and 24 also described in connection with FIG. 1 and described elsewhere herein. FIG. 2 shows an alternate embodiment and arrangement of data storage devices and host computers, for example, as may be included in an arrangement in which the host 38 and device 36 mirror the host 34 and the data included on the data storage device 32. In other words, the data storage device 36 may serve as a shadow of the device 32. In this particular arrangement, the host 38 may serve as an alternate system, for example, when host 34 experiences operating problems and is removed from the network. For example, if the host 34 and/or the device 32 experience a power failure or other type of system failure, the host 38 and the data stored on the device 36 may automatically come on line to replace and function as an alternate for the host 34 and the device 32. In order to allow the host 38 and device 36 to function as just described, the host 34 may include software that, for example, performs remote backup and copy operations to the devices 36 and 40 from the device 32. In other words, the host 34 may issue commands to the data storage device 32 to copy data to devices 36 and 40. In this arrangement, the device 32 may serve as a backup device for 36. This may allow the system 38 and device 36 to operate in the computer system 10 replacing the system 34 and device 32, such as when there is a power failure or other system problems of device 32 and/or host 34. In an instance in which the host 38 and device 36 function to replace the host 34 and device 32, the host 38 and device 36 need to have a designated backup storage device, which in the illustrated embodiment is device 40. Thus, the system 34 issues instructions to store data on data storage device 40 as well as data storage device 36.

It should be noted that, in a manner similar to that described in conjunction with FIG. 1, the connections between each of the data storage devices 32, 36, and 40 are identified by a connection identifier rather than a machine identifier. This is also explained in more detail in paragraphs that follow.

Figure 3:
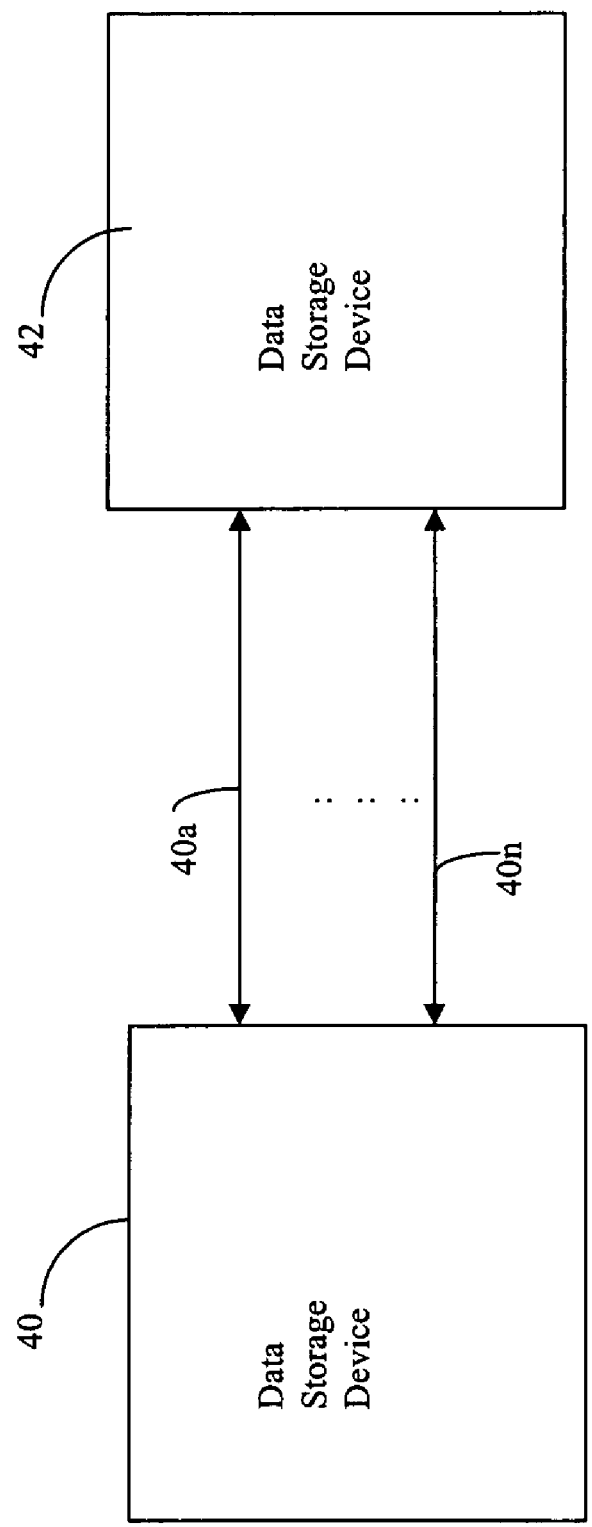
FIG. 3 illustrates an embodiment of the invention having connections between two data storage devices that may be included in the computer systems of FIGS. 1 and 2.

Referring now to FIG. 3, shown is an embodiment having different connections that may exist between any two storage devices interconnected in each of the foregoing arrangements. For example, the data storage devices 40 and 42 included in the computer system 10 of FIG. 2 are shown in more detail here as having any one of a variety of communication connections 40a–40n. Each of the connections 40a–40n may be uniquely identified by a connection identifier to specify a path, for example, for issuing a system call, a remote system call, or a multihop system call to a data storage device 42 directly or indirectly using, for example, the data storage device 40.

It should be noted that there may exist one or more connections between a host computer and a data storage device, or between any two storage devices. The number and type of each may vary in accordance with each implementation and uses. Also, a connection identifier specifying a particular connection between a first port of a first storage device and another port of a second storage device may be a number or other unique identifier enabling a message to be forwarded from one data storage device to another. In some embodiments, the connection identifier may be a number between one and sixteen, although other ranges of numbers are possible.

In the foregoing computer system arrangements of data storage devices and host computer systems, software may be executed on each of the host systems connected to the storage devices to perform the particular data operations, such as those related to performing backup operations and the like. Software also may execute on each of the data storage devices in connection with performing different data operations to receive the different data operation commands from the different host systems. Such software is available, for example, from EMC Corporation of Hopkinton, Mass.

Figure 4:
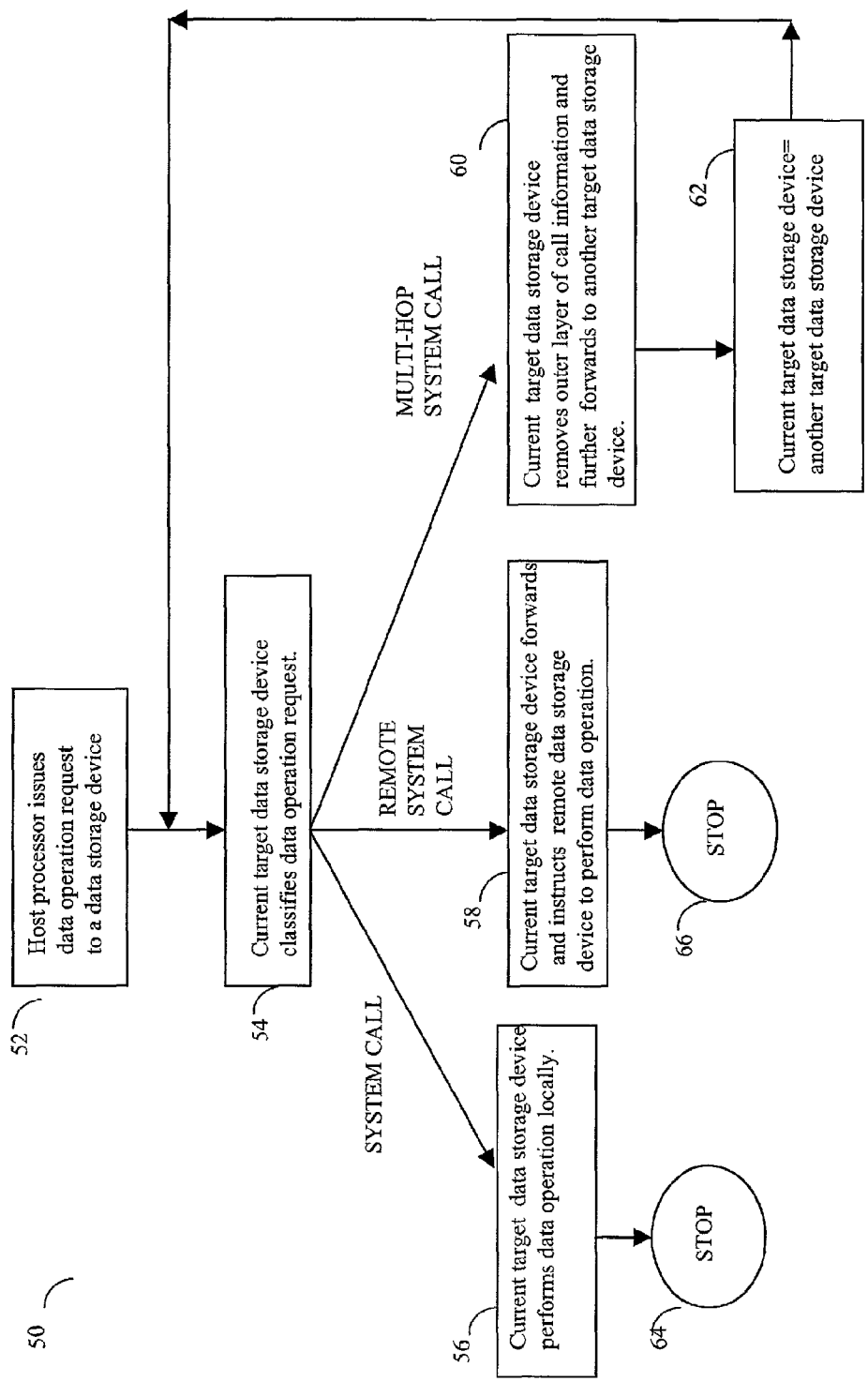
FIG. 4 is a flowchart of a method performed in a computer system according to the present invention for performing a data storage operation.

Referring now to FIG. 4, shown is a flowchart illustrating one embodiment for performing data operations, for example, in the computer system arrangements of FIG. 1 and FIG. 2. At a step 52, a host processor issues a data operation request to a data storage device. At a step 54, the current target data storage device that receives the request classifies the data operation request. In the illustrated embodiment, the data operation request may generally be classified as one of three categories: a system call, a remote system call, or a multihop system call. (Note that conventional I/O operating are not discussed here but, for purposes of this discussion, may be considered different from the data operation requests discussed in connection with FIG. 4). If the target data storage device classifies the data operation request as a system call, the current target data storage device performs the data operation locally. If the data operation request is classified as a remote system call with respect to the current target data storage device, the current target data storage device further forwards and instructs the remote data storage device to perform the data operation. In other words, the current target data storage device may be viewed as an intermediate storage device which further forwards and issues a data operation to yet another data storage device that performs the data operation. If the data operation request is classified as a multihop system call, the current target data storage device removes the outer layer of call information (i.e., the information that caused the command to reach the current target) and further forwards the call information or data to a second target data storage device. Control proceeds to a step 62 where the second target data storage device now becomes the current target data storage device with respect to subsequent processing steps. Control then proceeds to the step 54 where the newly designated current target data storage device classifies the data operation request. Generally, the multihop system call may employ the foregoing technique of embedding a remote system call that is applied to a data storage device that is three or more layers removed from the requesting host computer, i.e. more than a remote system call. As part of the interpretation process, the current target data storage device may remove an outer layer of data associated with a current call instance, and further forward the remaining data to a second target data storage device. This second target data storage device then performs the same process of removing an outer layer of data. The process of removing a layer of call information and further forwarding remaining data to another target data storage device may be performed until a remote system call or a system call is reached at the inner most layer of data.

The steps of the flowchart 50 are a method of classifying a data operation request and the method steps may be performed by each of the data storage devices included in an arrangement. Each incoming data operation request may be classified in accordance with the level of the system call with respect to the level of data device which is the receiving target data storage device from an initiating host computer. If the level is one implying that the receiving data storage device is the actual target data storage device to perform the designated data operation, a system call may be issued from the host system to the target device. With the level of two, a remote system call may be used to further forward the data operation instruction to a second level of data storage device from the first data storage device. If the level is greater than two, a multihop system call may be used in that the target data storage device to perform the data operation is three or more nodes removed from the issuing host processor.

Referring back to the computer system 10 of FIG. 2, for example, the host computer 34 may initiate a data operation request. Assume that the computer system diagram may be viewed as a graph of nodes in which each node is a computer system or a data storage device having edges that are the connections. A depth or level of one associated with the data operation request indicates a first data storage device 32 where a system call may be used to issue a data operation to be performed. With a depth of two, for example, if the host processor 34 issues a data operation request to be performed by a second storage data device 36, a remote system call may be used. With a depth of three, the host processor 34 may use a multihop system call, for example, to issue a data operation request to be performed by the third data storage device 40.

In one example, the data storage device 32 may execute the method steps included in the flowchart 50 in accordance with classifying the data operation request as a system call, a remote system call or a multihop remote system call, for example, as may be designated by an operation code in a particular field in which the data operation request. If the data storage device 32 classifies an incoming data operation request as a remote system call, the data storage device 32 may issue a remote system call to the data storage device 36 to perform the actual data operation. In the event that a multihop system call is detected, for example, by an operation code that may be included in the system call, the data storage device 32 may remove the outer layer of call information, such as a first level of connection identifier information which may indicate the second data storage device 36 as the device to which the remote system call is directed, and further forward remaining data to the storage device 36. In turn, the data storage device 36 now becomes the receiving or the current target data storage device and it proceeds to perform the processing steps 54, 56, 58, 60 and 62. Generally, any incoming system call that is classified as a multihop call by a data storage device performs the step of removing the outer layer of call information (step 60) and further forwarding the data that may be further encapsulated or embedded in the call to another target data storage device, for example, as may be specified by a current connection identifier (step 62). That target data storage device then proceeds to perform the classification of the embedded data. This process may be performed by each of the different target data storage devices in accordance with the connection identifier that may be included in a data operation request until either a system call or a remote system call has been classified by the current target data storage device. In some embodiments, a maximum number of hops may be specified, for example, as a system parameter or value.

Figure 5:
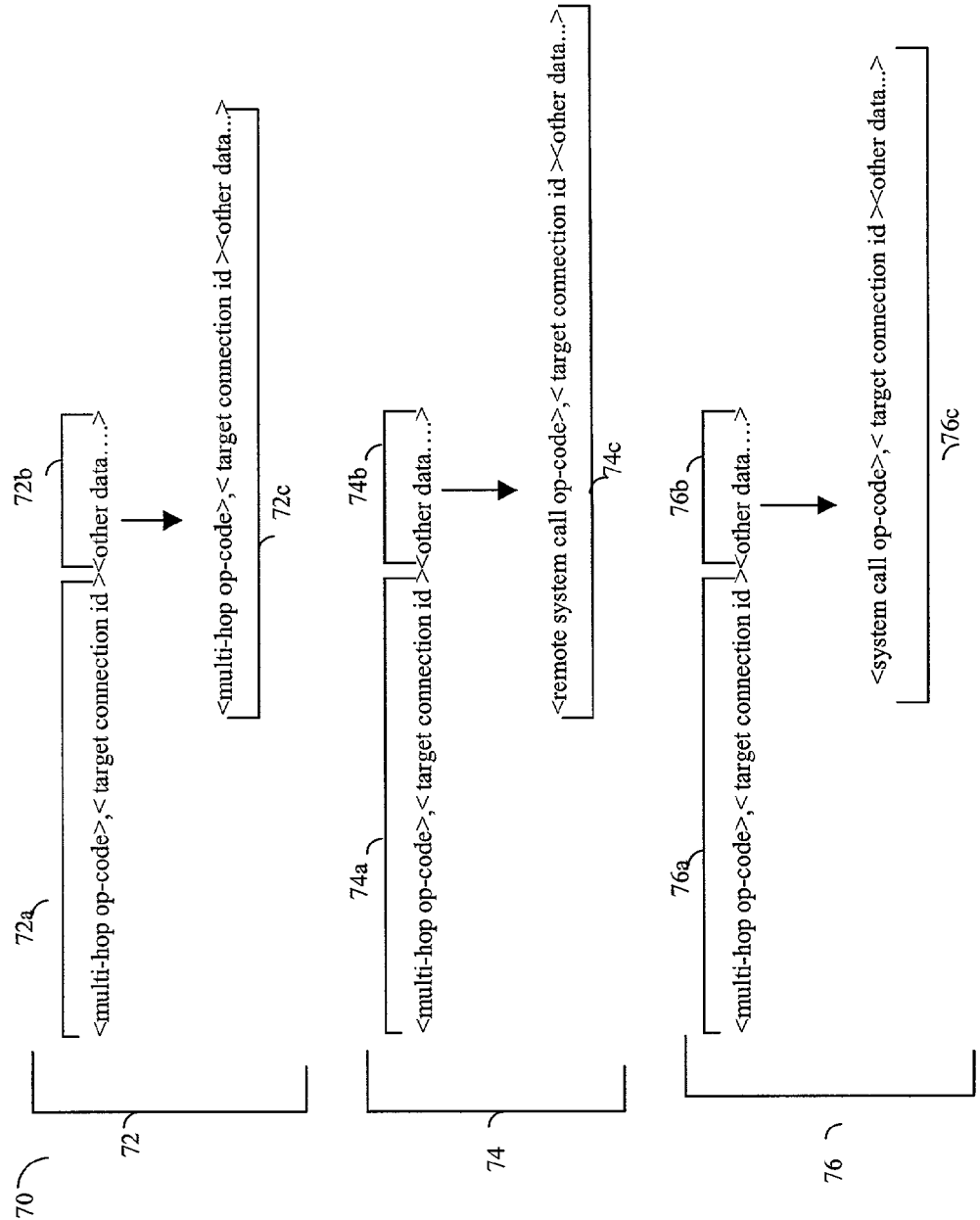
FIG. 5 is an example of how data included in a multihop system call may be interpreted by a target data storage device according to the present invention.
Figure 6:
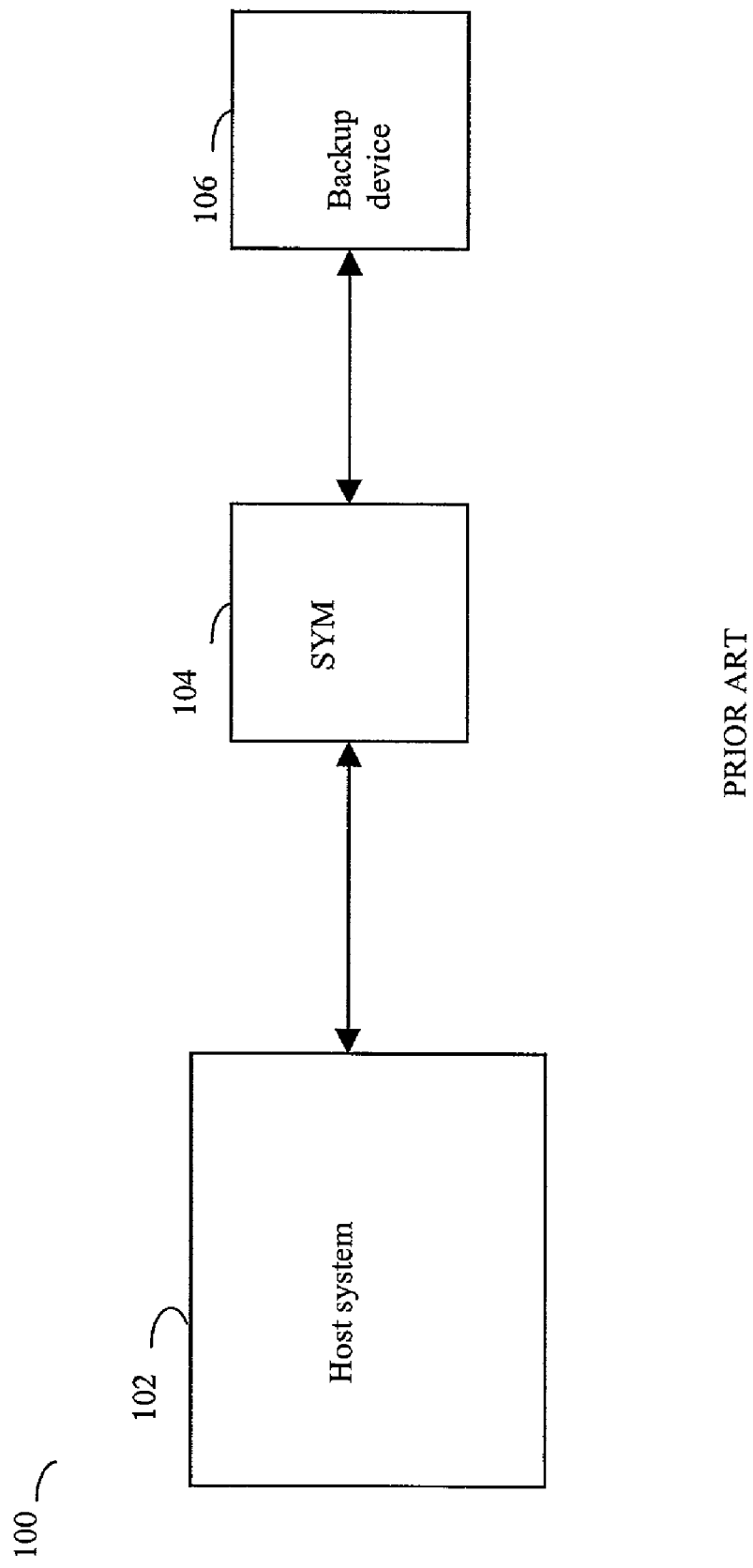
FIG. 6 is an example of an embodiment of a prior art indirect storage arrangement.

Referring now to FIG. 5, shown is an example of an embodiment of different interpretations of data that may be embedded in a multihop system call. An element 72 includes a message format having portions 72a and 72b. Taken together, the portions 72a and 72b may represent a format of a multihop system call. The portion 72a includes a multihop op-code and a target connection id which may be removed as in the processing step 60 by the current target data storage device. The target connection id included in the field 72a identifies a connection to yet another data storage device to which the other data portion 72b may be forwarded. The description 72c is a representation of how the receiving data storage device may interpret the data 72b while performing processing of step 54. Generally, a first data storage device may remove the portion 72a as part of the step 60, and then further forward the portion 72b to a second data storage device designated by the target connection id included in the field 72a. The other data 72b, when actually interpreted, for example, by the second data storage device, may be yet another multihop remote system call as indicated by field 72c. In other words, the other data 72b may be interpreted as the data which is actually included in the representation 72c.

Referring to element 74, shown is an example of another possible mapping of information included in a data operation request by a receiving target data storage device. In the processing of the step 60, a first data storage device may remove the portion 74a and further forward the portion 74b to a second target data storage device as specified by the target connection id included in the portion 74a. As an example, the data portion 74b may be interpreted by the second data storage device as represented in field 74c. In other words, the first data storage device forwards data to a second data storage device which further interprets the data it receives as a remote system call as represented in field 74c. Yet the third data element 76, includes a portion 76a and 76b similar to what is shown in elements 72 and 74. In the processing of step 60, a first data storage device may remove the portion 76a from the data received and further forward that data portion 76b to a second data storage device as designated by the target connection id included in field 76a. The second data storage device may then execute the processing of step 54, 56, 58, 60 and 62 and interpret the field 76b data as represented in a field 76c. In the illustrated example, the data which is passed to the second data storage device may be interpreted as a system call including operations, for example, which are performed in accordance with step 56.

What will now be described is a multi-execute command which may use techniques described elsewhere herein in connection with the multihop system call. However, techniques used in connection with the multi-execute command as described herein may also be used in embodiments of data storage arrangements having less than three levels.

Generally, a multi-execute command is a command that may be issued by a first processor, for example, from a host system, that is executed on one or more other processors, such as processors included in different Symmetrix™ systems that may be indirectly and directly connected to the first processor.

Figure 7:
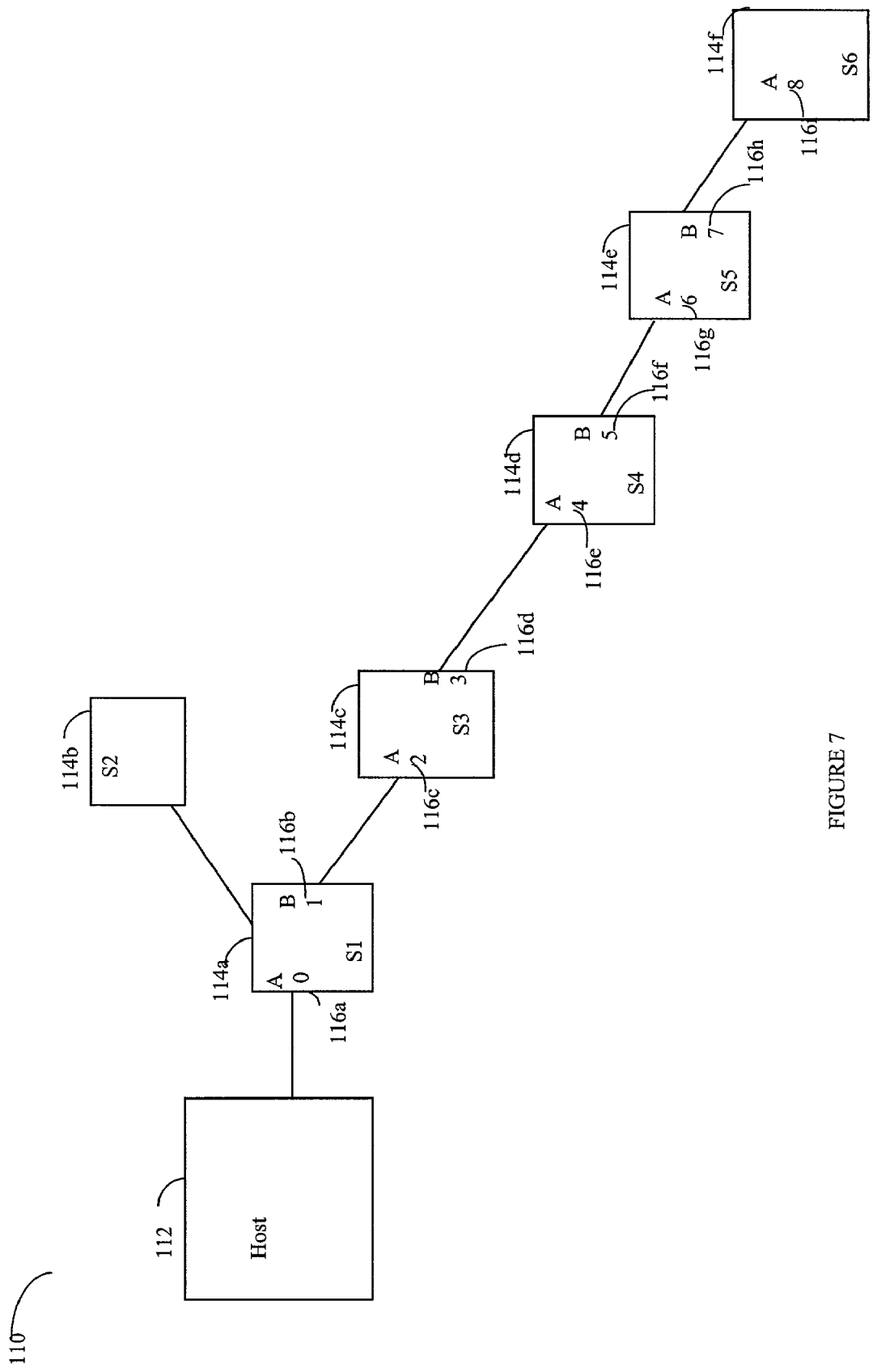
FIG. 7 is an example of an embodiment of a computer system that may be used in connection with execution of a multi-execute command.

Referring now to FIG. 7, shown is an example of an embodiment of computer system 110 within which a multi-execute command may execute. It should be noted that the computer system 110 of FIG. 7 is one example of a computer system within which the multi-execute command may operate and should not be construed as a limitation of the principles described herein. The computer system 110 includes a host system 112 and a plurality of data storage entities 114a–114f. As described in more detail elsewhere herein, the host 112 may be a host computer, such as a host computer 20 previously described in connection with FIG. 1.

Each of the data storage entities 114a–114f may be a data storage device, for example, such as a Symmetrix™ system also described in more detail elsewhere herein. As will be described in more detail in paragraphs that follow, the host computer 112 may issue a multi-execute command. In one embodiment, this multi-execute command may be a remote system call implemented using techniques associated with the multihop command described elsewhere herein. Functionally, the multi-execute command, as may be issued by the host 112, may cause the execution of one or more commands on one or more processors, for example, as may be included in the Symmetrix™ systems 114a–114f and other data storage entities that may include a processor. In other words, a single multi-execute command facilitates execution of one or more commands on multiple data storage devices that may be directly and/or indirectly connected to each other as well as to a host computer system issuing the multi-execute command.

The connection between the host 112 and the data storage entity 114a as well as between any other two entities in the data storage arrangement in the computer system 110 may be any one of a variety of different connections known to those skilled in the art and also described elsewhere herein. Generally, the type of communication connection or connections available between any two entities in a computer system having a storage arrangement may vary in accordance with each particular type of entity in an embodiment. In the example embodiment described herein in connection with FIG. 7, each of the data storage entities 114a–114f may be Symmetrix™ systems. Connections between each of the Symmetrix™ systems 114a–114f may be an RDF or Remote Data Facility connection.

It should be noted that in one embodiment including the one or more data storage entities that are Symmetrix™ systems as in the computer system 110 of FIG. 7, RDF is a facility that may be used in performing remote communication operations, such as between Symmetrix™ systems. Such operations may include, for example, user data transfer operations, such as file operations, and other data transfers as may be associated with commands, status, configuration information, and the like. RDF may be a implemented in an embodiment as a data layer residing in each Symmetrix™ system. Multi-execute commands may use the services of RDF in forwarding a multi-execute command as a remote system call to another Symmetrix™ system. Generally, the multi-execute system call may use the services of RDF to forward a request to a data storage device or other node within the computer system 110. RDF may be used in facilitating data transmissions such as between Symmetrix™ systems, and the target or receiving Symmetrix™ system may do the work in connection with executing a system call.

It should be noted that in an embodiment of a computer system using techniques associated with the multi-execute command described herein, data storage entities may be Symmetrix™ systems or other types of data storage entities that may vary with each embodiment.

A multi-execute command may be issued by the host system 112 and may indicate that one or more of the processors included in the data storage entities 114a–114f execute a particular command. It should be noted, as will be described herein, that one or more commands may be executed in either or both directions in a communication path specified between a host and final or ending data storage entity, such as between 112 and 114f respectively. In other words, the techniques described herein may be used to indicate that one or more of the data storage entities is to execute a command in the forward direction of a communication path, such as when passing a multi-execute command from the host 112 to the data storage entity 114f. Alternatively, or in addition to forward execution, the technique that will be described herein may also be used for indicating a data storage entity to execute a particular command on a return path from the end data storage 114d returning information to the host 112.

In this example, communication connections between each of the data storage entities 114a–114f are RDF connections. However, other embodiments may include other connections between data storage entities to facilitate communications associated with the multi-execute command. Additionally, a Symmetrix™ system may communicate with other elements in the computer system 110 using different types of directors that may be included in the Symmetrix™ systems. For example, a Symmetrix™ may include any one of a variety of different director types, including a remote adapter (RA) as well as a host adapter (HA), for example when communicating with the host 112. It should also be noted that other types of communication connections may be used for facilitating communications between each of the data storage entity and the host processor 112.

A "hop" may be viewed as a level when traversing a path between different entities or nodes such as in the computer system 110. In this example, a hop may also may also be internal to a particular data storage entity, such as a Symmetrix™ system 114a–114f. In this example embodiment, an internal hop with regard to a Symmetrix™ system, such as 114a, is indicated by the "A" and "B" within each of the Symmetrix™ systems. When counting or tracking the number of hops with regard to traversing a path between a beginning point and an end point for a path, a hop count may be increased between two positions or points, such as "A" and "B" of a single Symmetrix™ system. In this embodiment, different communication adapters are associated with each of the points designated "A" and "B" within a single Symmetrix™ system. Element 114a may be implemented as a host adapter (HA) to facilitate communication between the Symmetrix™ system 114a and the host 112. A different type of adapter and processor board may be used within the Symmetrix™ system 114a at point "B", for example, when communicating with the Symmetrix™ system 114c S3. Symmetrix™ system S1 "B" may be a remote adapter (RA) and associated processor board(s) used for communication between two Symmetrix™ systems, such as 114a S1 and 114c S3. The particular type of adapter associated with a particular "A" or "B" element within a Symmetrix™ system may vary in accordance with each embodiment and external connections for each Symmetrix™ system. The use of elements "A" and "B" may represent generalizations of the different types used in communicating between different entities in the computer system 110.

Described in paragraphs that follow is an example of a multi-execute command for performing a "preparation" step, as may be performed by an RA included in each of the Symmetrix™ systems 114a–114f. In other words, for each of the RAs included within a Symmetrix™ system, an indicator indicates whether a "preparation" step is performed. On the return path, the command is executed if all nodes indicated in the preparation step have been successful.

Information associated with the multi-execute command may be passed between different entities, such as 114a and 114c, and communication points, such as between S1 A and S1 B. This information may include, for example, input and output parameters and return information as well as state information being tracked for any one or more of a variety of different purposes. Data associated with the multi-execute command may include, for example, a bit vector or a bit matrix for one or more commands indicating, for each of the points or nodes in a path whether each node is to execute a particular command. This will be described in more detail in paragraphs that follow. State variable or information, such as the number of hops being counted or tracked may also be associated with a particular multi-execute command. Other information associated with a multi-execute command may include, for example, path specification information such as an address, node number or other type of identifying information associated with defining a particular path through specific points for forwarding the multi-execute command. In other words, different types of information may be communicated along a path of a multi-execute command to indicate, for example, that the multi-execute command is to pass from data storage entity 114a, point "A" to data storage entity 114f, point "A" through points "A" and "B" of data storage entities 114c, 114d, 114e and 114f. Subsequently, the multi-execute command returns back following the same path in reverse through each of the points. Data storage entity 114a then further returns information to the host 112.

In the example that follows, each point in the path traversed, for example, from the data storage entity 114a to the entity 114f may be associated with a particular "hop node number". For example, in the description that follows, entity 114a S1, point "A" may have an associated hop node number of 0. Subsequently point "B" of S1 may have a corresponding hop node number of 1. Similarly, 114c S3 point "A" may have a hop node number of 2, and 114c S3 point "B" may have a hop node number of 3. This, and subsequent hope node numbering associated with each point is indicated within the embodiment 110 of FIG. 7 by elements 116a–116i. The hop node number associated with each of the points as indicated in the computer system 110 of FIG. 7 may be used, for example, in specifying a complete communication path between two points. Alternatively, an embodiment may include information about only the starting and ending point rather than additional information for points in between the starting and end points. Information such as the path specification may be included in the multi-execute command.

Figure 8:
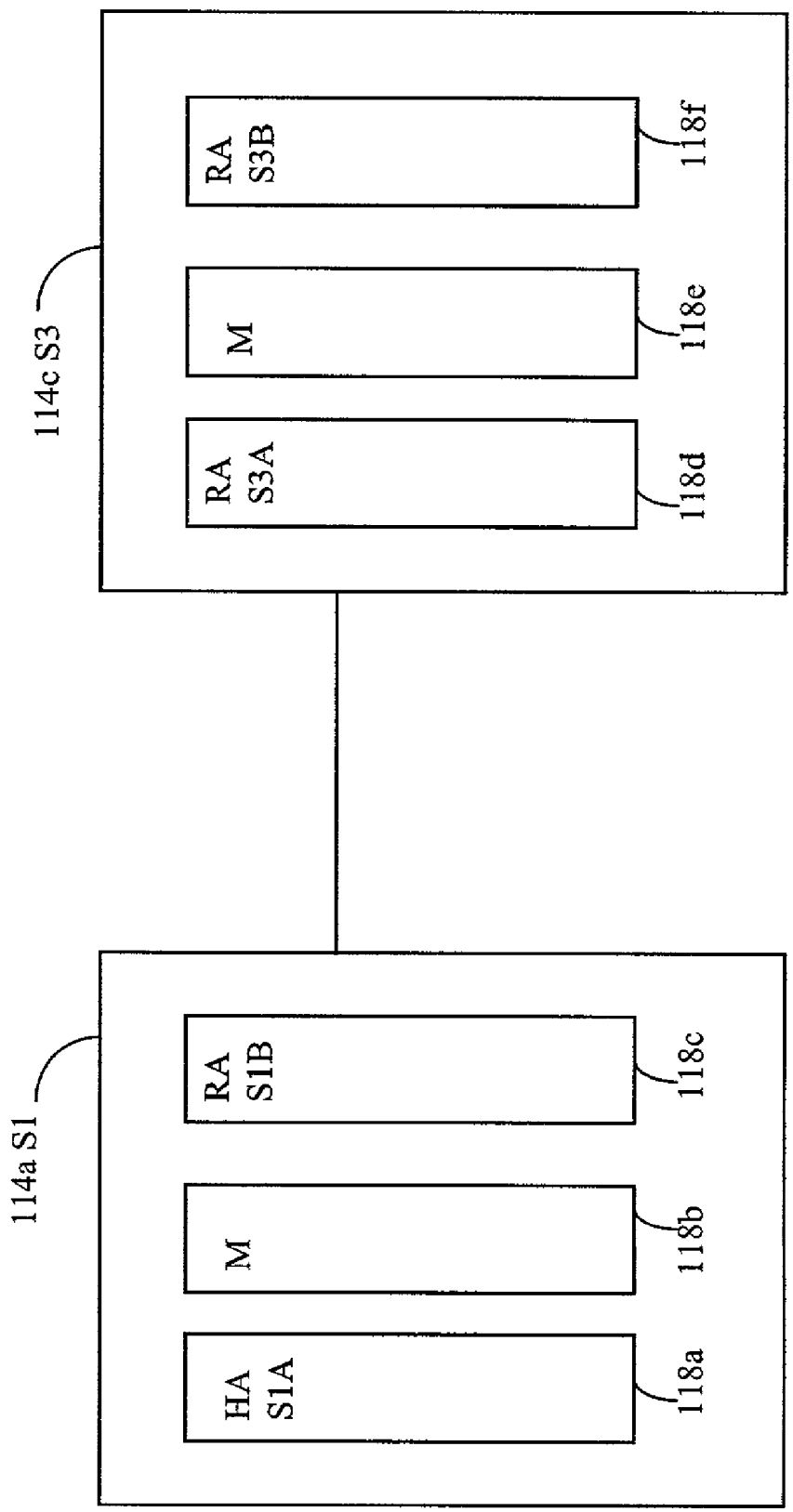
FIG. 8 is an example of an embodiment showing more detailed descriptions of two data storage entities included in the embodiment of the computer system of FIG. 7.

Referring now to FIG. 8, shown is an example of an embodiment in more detail of the different types of adapters and processor boards which may be used to facilitate communication between two Symmetrix™ systems included in the computer system 110 of FIG. 7. It should be noted that shown in FIG. 8 are the Symmetrix™ systems 114a and 114c. However, what will be described between these two particular Symmetrix™ systems, and the detail within each, may also be generally applied to any of the other data storage entities that are Symmetrix™ systems within the computer system 110.

Symmetrix™ system 114a is shown as including a host adapter 118a, global or shared memory 118b, and a remote adapter 118c. The Symmetrix™ system 114c is shown as including a remote adapter 118d, global or shared memory 118e for use by the Symmetrix™ system 114c, and a remote adapter 118f. Generally, as known to those skilled in the art, the remote adapter may include a processor board. The multi-execute command may indicate a particular command to be performed by each processor board that may be associated with elements such as 118a, 118c, 118d, and 118f. The global or shared memory such as 118b within the Symmetrix™ system 114a may be used for facilitating communications between and within elements of that particular Symmetrix™ system. Similarly, memory 118e may be used to facilitate communications within the Symmetrix™ system 114c.

Not shown in FIG. 8 is a connection between Symmetrix™ device 114a and the host system 112. The host adapter 118a may be used to facilitate communications between the host computer system 112 and the Symmetrix™ system 114a. The remote adapter 118c and 188d may use RDF to facilitate communications between Symmetrix™ systems such as 114a and 114c in this particular example. Also not shown in FIG. 8 but implied with reference to the computer system 110, is a connection from Symmetrix™ system 114c to another Symmetrix™ system 114d previously described in connection with FIG. 7. The remote adapter 118f is used to facilitate communication with another data storage entity, for example such as Symmetrix™ system 118c which is not shown in FIG. 8. It should be noted that in FIG. 8, the connections external to the Symmetrix™ systems 114a and 114c have been omitted for the sake of simplicity. The foregoing as described in connection with Symmetrix™ systems 114a and 114c may also apply to other Symmetrix™ systems included within the computer system 110 previously described in connection with FIG. 7.

It should be noted that the host adapter 118a may include a processor board upon which a command may be executed, for example, as may be associated with the multi-execute command.

Figure 9:
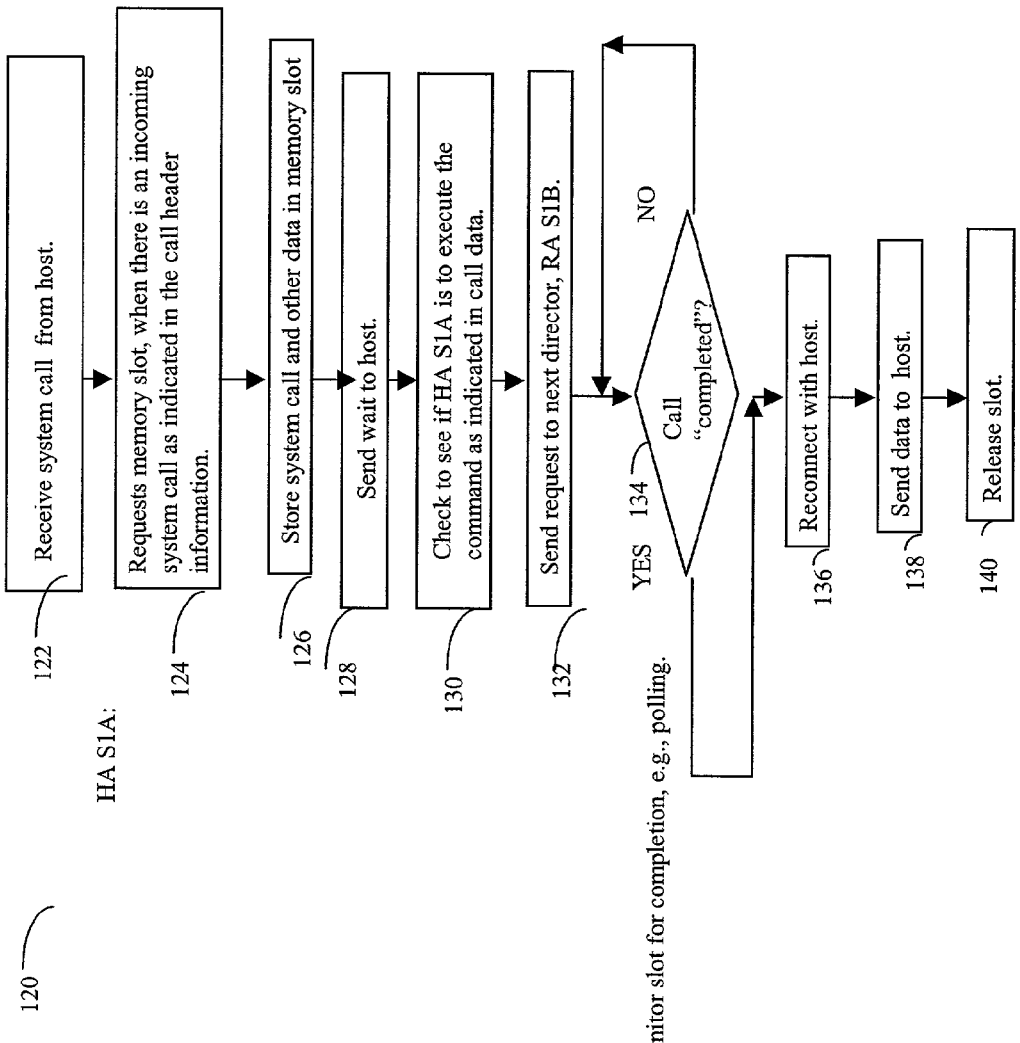
FIG. 9 is a flowchart of method steps of one embodiment that may be performed by the host adapter of a data storage entity included in the computer system of FIG. 7.
Figure 10:
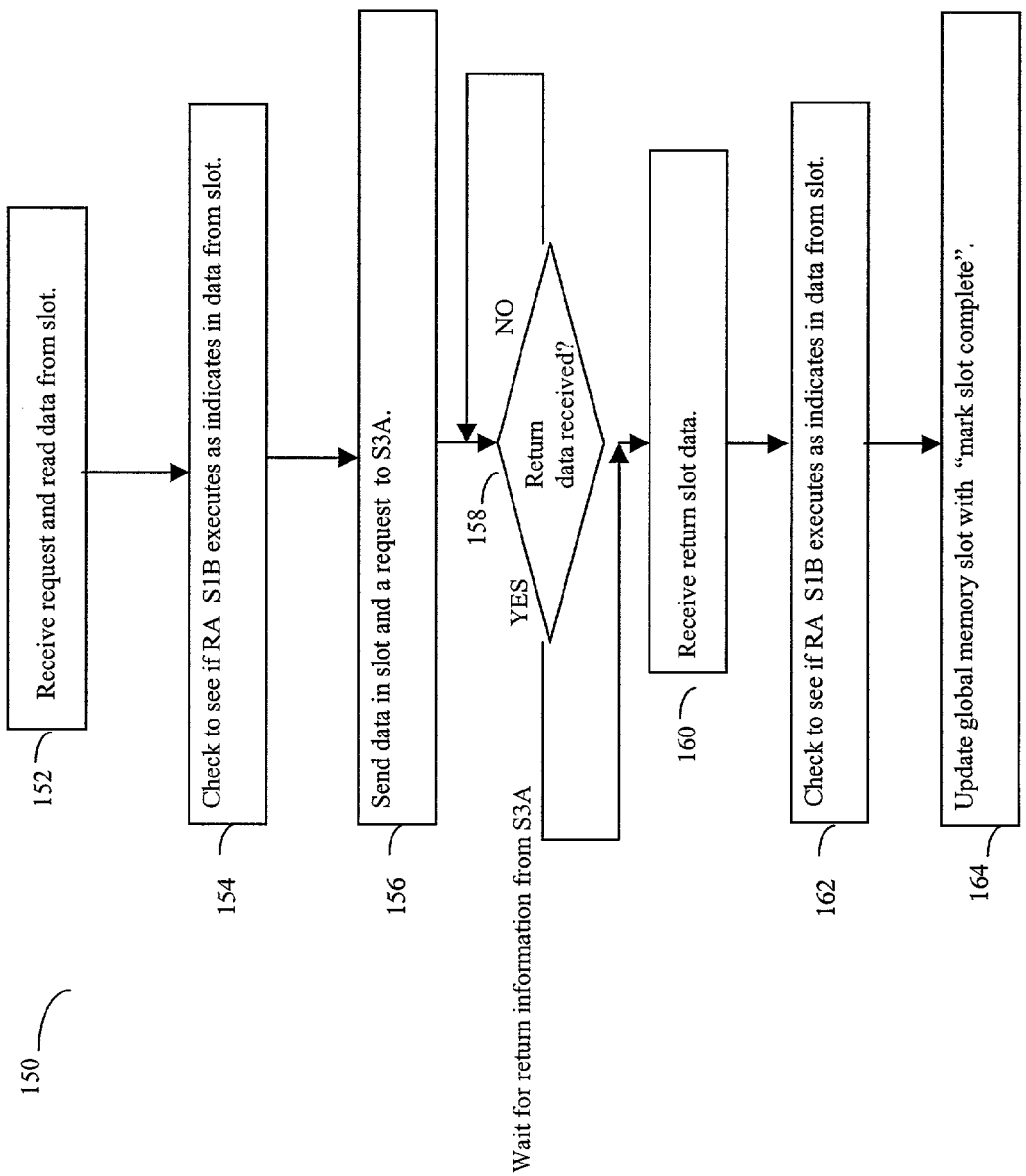
FIG. 10 is a flowchart of method steps of one embodiment that may be performed by a remote adapter of a data storage entity included in the computer system of FIG. 7.

What will now be described in connection with FIGS. 9 and 10 are flowcharts of different steps of a method that may be executed in this embodiment when a multi-execute command is forwarded between communication points and different Symmetrix™ systems as well as other data storage entities that may be included in the computer system 110 of FIG. 7.

Referring now to FIG. 9, shown is a flowchart of steps of an embodiment that may be performed using the host adapter 118a previously described in connection with FIG. 8. The steps that will be described in connection with flowchart 120 are those associated with processing a multi-execute command. At step 122, the host adapter 118a receives an incoming system call from the host system 112 previously described in connection with FIG. 7. At step 124, the host adapter 118a requests a portion of global or shared memory that may be referred to as a memory "slot" to store data and other information associated with the incoming system call. In this example, a 32K memory slot or other size chunk may be requested from the global memory 118b. Also in this particular example, the system call is indicated by a particular value that may be included in the remote procedure call header information indicating that this is an incoming system call.

At step 126, the host adapter 118*a* stores data associated with the system call in the memory slot of the global memory 118*b*. At step 128, a wait command or status message is sent to the host by the host adapter 118*a* indicating that the system call is being processed and executed.

At step 130, a determination is made to see if the host adapter 118*a* is to execute the incoming system command as may be indicated in call data. It should be noted that the mechanism used in one embodiment for indicating which points or nodes in a path are to execute a particular command are described in more paragraphs that follow. In one embodiment as will be described in more detail herein, a bit vector or matrix of multiple bit vectors may be used to indicate whether a particular command is performed or executed at each node in a path. Control proceeds to step 132 where the request is sent to the next director, which in this example, is the remote adapter RA S1B 118*c* as shown in FIG. 8.

At step 134 a determination is made as to whether the call has completed. In other words, at this point the host adapter 118*a* monitors the data included in the previously allocated slot of memory 118*b* for completion, for example, such as by polling or other technique that may be used in a particular embodiment to determine if a call has been completed at step 134. If a determination is made that the call is not complete, control proceeds back to step 134 for subsequent monitoring to determine when the call is complete.

It should be noted that in this example for the multi-execute command, a determination of whether a call is complete as may be determined by the host adapter 118*a* may be determined in accordance with information updated in the global memory slot of the area 118*b* using data returned from another node. For example, data may be returned by RA S1B 118*c* to HA S1A 118*a*. In one embodiment, the call may be determined as "complete" at step 134 by the host adapter 118*a* subsequent to forwarding the multi-execute command to Symmetrix™ system 114*f* and returning to the host adapter 118*a*.

Subsequent to determining that the call has been completed at step 134, control proceeds to step 136 where the host adapter 118*a* reconnects with the host at step 136. At step 138, the host adapter 118*a* forwards any data such as return parameter information, status and other types of information to the host system 112. Subsequently, a clean-up process may be performed, for example, by the host adapter 118*a* such as by releasing the portion of global memory associated with the slot at step 140.

An embodiment may include machine executable instructions which implements the flowchart 120 of FIG. 9. These may be performed and executed by the host adapter 118*a*.

Referring now to FIG. 10, shown is a flowchart of method steps of one embodiment as may be performed by the remote adapter 118*c*, RA S1B, previously described in connection with FIGS. 7 and 8. In this example, the method described in flowchart 150 may be performed by the remote adapter, for example, by executing machine executable instructions which implement the flowchart 150 of FIG. 10 that will be described herein.

The remote adapter 118*c* receives the request at step 152, for example, as may be placed in the slot of the global memory area 118*b* by the host adapter 118*a*. Data may be read from this global memory area slot 118 by the remote adapter 118*c*. A determination is made at step 154, for example, by looking at a bit vector or vectors to see if the remote adapter 118*c* is to execute a particular command or commands as indicated by data of the bit vector stored in the global memory area 118*b*. In one embodiment, the data stored in the global memory area as described herein may be a bit vector having an entry with a value of 1, for example, when a particular adapter, such as the remote adapter 118*c*, is to execute a command associated with the bit vector.

Control proceeds to step 156 where the data in the slot and a request are sent to the remote adapter 118*d*, RA S3A, of the Symmetrix™ system 114*c*. At step 158, a determination is made by the remote adapter 118*c* as to whether return data has been received from the remote adapter 118*d* of the Symmetrix™ system 114*c*. The monitoring process of step 158 is similar, for example, to the processing performed at step 134 in connection with flowchart 120 or FIG. 9. In other words, the request is forwarded to the next communication point, which in this instance is another remote adapter 118*d*. The forwarding remote adapter 118*c* waits for return information from 118*d*.

When a determination is made at step 158 that return data has been received, for example, from the remote adapter 118*d*, control proceeds to step 160, where the return data may be read by the remote adapter 118*c*. A determination in this embodiment may be made to see if the remote adapter 118*c* is to further execute a command as indicated by the data placed in slot 118*b*. An embodiment may optionally include the processing step, for example, at step 162 to execute a command via the multi-execute command by a processor in the reverse or return direction. In other words, an embodiment may include processing to perform an operation in connection with the multi-execute command in the forward and/or reverse direction.

Control proceeds to step 164 where the global memory slot is updated with information to indicate that the command has been completed. In other words, an indication may be placed in the global memory slot at step 164 to signal to the host adapter 118*a* that the call has been completed. Upon depositing such an indication in the global memory area, step 134 results in a determination that the call has been completed.

Referring now to FIG. 11, shown is an example of an embodiment of data that may be associated with a multi-execute command. Included in the data representation 200 in tabular format is a variety of different types of information that may be associated with a multi-execute command. In this particular example, the table 200 includes a vector C1 202, and a vector C2 204, which collectively may represent 2 bit vectors indicating, as by a specified bit value of 0 or 1, as to whether a particular node or point with a particular hop number is to execute a command.

In this example, the columns entitled "total hops" 208, "this_hop_count" 210 and "this_hop_node" 212 may represent state information used to track various states of the multi-execute command in accordance with the different hops. Collectively, the data included in bit vectors 202 and 204 may be referred to as hop vectors forming a matrix in one embodiment indicating whether a particular hop node is to execute an associated command. Each of the bit vectors 202 and 204 may be associated with a separate command that may be executed by each of the different hop nodes. Each of the hop nodes is associated with an entry in each of the bit vectors. Thus, this example shows a multi-execute command which includes a plurality of commands that may be performed by a specified hop node associated with a corresponding bit vector entry.

In this example, an entry of the bit vector C1 202 having a value of 1 indicates that a first operation is performed by a node. This first operation may be for a node to perform an assessment as to whether this node is capable of executing a particular operation. The operation may actually be executed in the reverse direction or upon traversing nodes in a return path. The first operation associated with the bit vector C1 may be a "preparation" step, and the second operation associated with the bit vector C2 may be an "execute" step. For example, as part of the "preparation" for execution of COMMAND1 associated with vector C1, a node may check the status of relevant hardware, and the like used in connection with COMMAND1. This preparation phase or step may assist in ensuring that, on the return path, the node is actually successful at executing COMMAND1.

Additionally a boolean variable may be set with each execution of the first operation (e.g., preparation in the example) in accordance with whether the first operation was successfully performed on a particular node. A value associated with this boolean may be communicated between each pair of nodes, for example using the global or shared memory described in more detail elsewhere herein. Collectively, this boolean at a node "n" may reflect whether all nodes prior to "n" on the path in a first direction have successfully performed the first operation. A node, n, may update the boolean variable by performing a logical AND of the current value with a "1" if the first operation is successfully executed by node "n", and a "0" otherwise. In other words, the boolean variable represents collectively at a particular node "n" whether the first operation has been successfully executed on all prior nodes. Subsequently, node "n" further updates the boolean variable to reflect the success or failure with respect to node "n". This value may be passed to the next node in the path.

One use of the foregoing first operation as a "preparation" for COMMAND1 in a first direction, and the second operation as "execution" of COMMAND1 in a second reverse direction, combined with the boolean variable may be used in an embodiment to check the status of relevant hardware, software, and the like upon a forward path through a plurality of nodes. The second operation, execution of COMMAND1, may be performed in connection with reverse path node traversal only if the value of the boolean variable is "1". That is, COMMAND1 is only actually executed in accordance with vector C2 if, for each node as indicated in accordance with vector C1, the "preparation" was successful. If even a single node has had an unsuccessful "preparation", the value of the boolean variable in this example is "0" and COMMAND1 is not actually executed on any node. In this example, as shown in FIG. 11 table 200, the values of vectors C1 and C2 may be the same for corresponding nodes in the path as associated with bit vector positions. However, for other uses and in other embodiments, the values of the vectors may differ in accordance with each command and operation(s) performed.

It should be noted that each point in the communication path in this example has an identifying and unique integer as indicated in the "this_hop_node" column 220. "This_hop_node" column 212 indicates an integer value uniquely associated with each node or point. The integer values for "this_hop_node" may be, for example, as associated with each communication as indicated in the computer system 110 of FIG. 7 by the values 116a through 116i. In other words, this hop node 212 may be used to indicate the next node to be traversed in the path. In this example, a path associated with the multi-execute command may be formed from node numbers 0 through 8, and then back again from node number 8 to node number 0. Referring back to FIG. 7 computer system 110, this sequence of node numbers refers to a communication path associated with multi-execute command in this example from 114a, 114c, 114d, 114e, 114f, and then a return path back to 114a through all of the intervening nodes in reverse order.

The bit values contained in the vectors 202 and 204 may be examined, for example, at steps 130 and step 154 to be determine whether a particular command is to be executed at a particular point. In this example, the bit vector C1 may indicate whether a node is to perform a first operation of "preparation for COMMAND1", and bit vector C2 may indicate whether a node such as an RA is to "execute COMMAND1", where COMMAND1 may be any one of a variety of different commands corresponding to functionality that may be included in an embodiment. These bit vectors, such as C1 and C2, may be used collectively in a multi-execute command to perform a "preparation" step of corresponding RAs in a forward direction from the point of origination, and, subsequently, an "execution" step for the corresponding RAs in a reverse of return path direction.

The "total hops" column 208 indicates the total number of points traversed with the total number of hops that have been visited associated with a multi-execute command. It should be noted that the "total hops" may always be incremented. For example, the "total hops" may be incremented upon visiting the next node or point in a particular communication path associated with a multi-execute command even if, for example, a particular point is visited more than once, and also if execution of a particular command fails or has other processing errors.

The variable represented in the column "this_hop_count" 210 may represent the total number of successful hop counts. The value of "total hops" in column 208 may be incremented each time a new node is visited regardless of whether there has been successful execution of a command. This is in contrast to "this hop count" 210 which may indicate the number of successful executions of the multi-execute command. If there is an error in processing a particular command, for example, "this_hop_count" may not be increased.

It should also be noted in this example that there is a single "this_hop_count" vector 210 associated with 3 particular commands. "This_hop_count" may be incremented, for example, upon successful completion of all of the commands that may be executed in accordance with bit values of vectors 202 and 204 collectively. If any one of these commands fails upon execution, "this_hop_count" may not be incremented. Other embodiments may increment or decrement "this_hop_count" in accordance with other criteria. In this particular example, "this_hop_count" may be used, for example, in error detection, as well as information that may be communicated to the host computer system. For example, if "this_hop_count" equals "total hops" upon return to point RA 118a, this may indicate that no errors have occurred in processing any of the commands. However, if these two counts do not match and "this_hop_count" is less than "total hops" final value, it may be determined than an error in processing may have occurred.

An embodiment may also include an instance of "this_hop_count" vector 210 at for each of the commands indicated by a command bit vector, such as for each of 202 and 204. In other words, rather than associate the commands collectively with a single vector 210, there may be multiple vectors of "this_hop_count" used, for example, in error detection.

As known to those skilled in the art, other embodiments may use other data structures besides a bit vector to represent an indication whether a particular node is to execute an associated command. Also, although the foregoing description and table 202 includes 2 bit vectors each corresponding to a different command, an embodiment may include a different number of bit vectors. An embodiment of the multi-execute command may provide for executing only a single command on more than one processor. An embodiment of the multi-execute may provide for executing a plurality of different commands on more than one processor having a maximum limit that may vary in accordance with the particular limitations of each implementation and system.

Additionally, an embodiment may include functionality for communicating return information between any two points. These may be in any one of a variety of forms, for example, as return parameters or values that may be stored in a buffer transmitted with the multi- execute command data. Other information may be communicated between any two points, for example, using global memory if the two points are within the same Symmetrix™ system. Information may also include status and error processing data and may vary in accordance with each embodiment.

It should be noted that limitations used in the foregoing may vary in accordance with each embodiment. For example, an embodiment may have a time limitation associated with the maximum time or wait period that the host system 12 may wait for results returned from 118a in connection with the multi-execute command. This time limitation may further affect the maximum path length or number of processors that may be indicated to execute a command associated with the multi-execute command. Each point having a processor may also have a maximum time period, for example, that may limit the maximum amount of time for monitoring, for example, in connection with step 134 of FIG. 9 and step 158 of FIG. 10.

As described above, information communicated between points may be included as part of the multi-execute command data, and may also be stored in global or shared memory and as part of the return values, and the like. However, there may be buffer size limits associated with a multi-execute call in accordance with system parameters. These may also vary in accordance with each embodiment.

Data transfers, such as in connection with the multi-execute command may be performed using data push and/or data pull operations with respect to data passed between points. For example, with reference to FIG. 8, one embodiment may have 118c send a request to 118d. 188d may issue a data pull or copy when ready to copy data. Another embodiment may have 118c send a request including the data for the multi-execute call to 118d and "push" the data to 118d rather than wait for 118d to be the initiator of the data transfer.

It should also be noted that the multi-hop command may be implemented using a single command bit vector, such as 202 described in connection with FIG. 11, having only the bit corresponding to the end point enabled.

As part of preparation, for example, an RA may check the status of one or more disks associated with a particular Symmetrix™ system. An embodiment may also have a node perform one of more subcommands associated with a command, such as COMMAND1, in addition to performing COMMAND1 itself. One or more SUBCOMMANDS may be associated with a COMMAND1. In one embodiment, the execution of these one or more SUBCOMMANDS may be conditionally determined at runtime during execution of microcode associated with COMMAND1. In other words, the logic of determining and conditionally executing SUBCOMMANDS is determined dynamically at runtime in accordance with microcode of COMMAND1.

Referring back to the example associated with FIG. 11 with a first "preparation" operation and a second "execution" operation, the particular actions an embodiment may perform when and if a node is "unsuccessful" in performing the first operation or "preparation" step may vary in accordance with each embodiment. A first embodiment may continue communications and execution of operations on subsequent nodes even though a node at an earlier point in the path in the first direction is unsuccessful. Another embodiment may, upon unsuccessful execution of the first "preparation" operation, continue to communicate with other nodes in the path in both directions. However, the microcode, for example, associated with the multi-execute commands may not be invoked. In other words, the path may be traversed, but the code associated with the multi-execute command is not invoked. Yet another embodiment may completely "short-circuit" the multi-execute command and, upon determination that a first node unsuccessfully executes a first "preparation" operation, begin a return path back to the point or node of origination.

While the invention has been disclosed in connection with various embodiments, modifications thereon will be readily apparent to those skilled in the art. Accordingly, the spirit and scope of the invention is set forth in the following claims.

What is claimed is:

1. A method for performing an operation on a plurality of processors comprising:
   receiving, at a first processor in a first data storage entity, a multi-execute command from a host system, said multi-execute command being a single system call indicating which processors perform at least one operation;
   determining, in accordance with a data structure, whether the first processor is to perform a first operation associated with said multi-execute command, said data structure including an indicator for each of said plurality of processor indicating whether said each processor is to perform said first operation;
   forwarding said multi-execute command to a second processor in a second data storage entity; and
   determining, in accordance with said data structure, whether the second processor is to perform said first operation associated with said multi-execute command.

2. The method of claim 1, further comprising:
   performing said first operation using at least one of said first processor and said second processor.

3. The method of claim 1, further comprising:
   defining a data structure indicating which processors included in said computer system perform said first operation associated with said multi-execute command.

4. The method of claim 1, wherein at least one of said first and said second data storage entities includes a shared memory, said shared memory being used for communicating data associated with the multi-execute command between two processors in said at least one of said data storage entities.

5. The method of claim 4, wherein said data includes at least one of: an input parameter, an output parameter, and status information.

6. The method of claim 5, wherein said status information includes data used in error processing and tracking.

7. The method of claim 1, wherein a second operation is associated with said multi-execute command, said data structure including a second indicator for each processor indicating whether said each processor is to perform said second operation.

8. A method for performing an operation on a plurality of processors comprising:
- issuing a multi-execute command by a host system to a first processor in a first data storage entity connected to the host system, said multi-execute command being a single system call indicating which processors perform at least one operation;
- determining whether the first processor is to perform a first operation associated with said multi-execute command;
- forwarding said multi-execute command to a second processor in a second data storage entity;
- determining whether the second processor is to perform said first operation associated with said multi-execute command;
- defining a data structure indicating which processors included in said computer system perform said first operation associated with said multi-execute command;
- determining a path of said multi-execute command, said path including said first and said second processors, said path defining a portion of the processors in said computer system that are forwarded said multi-execute command, said portion including at least two processors; and
- wherein said data structure is a bit vector having an entry associated with a corresponding processor included in said portion, each entry in said bit vector having a value of 1 if said corresponding processor is to perform said first operation, and a value of 0 otherwise.

9. The method of claim 8, wherein said multi-execute command is used to indicate whether each of the processors included in said portion is to perform a plurality of operations, said plurality of operations including said first operation and a second operation different from the first operation; and
- wherein said bit vector is a first bit vector and said data structure includes a second bit vector having an entry associated with a corresponding processor included in said portion, each entry in said second bit vector having a value of 1 if said corresponding processor is to perform said second operation, and a value of 0 otherwise.

10. The method of claim 9, wherein said multi-execute command causes an operation to be performed by a processor in one of a forward path direction and return path direction, said forward path direction being defined as forwarding said multi-execute command from said first processor to an end processor, said return path direction being defined as forwarding said multi-execute command from said end processor to said first processor.

11. The method of claim 10, further comprising:
- performing said first operation on a processor included in said portion in said forward path direction; and
- performing said second operation on a processor included in said portion in said return path direction.

12. The method of claim 11, further comprising:
- indicating in said first bit vector whether a processor in said portion is to perform said first operation in said forward path direction; and
- indicating in said second bit vector whether a processor in said portion is to perform said second operation in said return path direction.

13. The method of claim 12, wherein said first operation includes enabling communications of an adapter, and said second operation includes disabling communications of an adapter.

14. A computer program product implemented on tangible media for performing an operation on a plurality of processors in a computer system comprising:
- machine executable code for receiving, at a first processor in a first data storage entity a multi-execute command from a host system, said multi-execute command being a single system call indicating which processors perform at least one operation;
- machine executable code for determining, in accordance with a data structure, whether the first processor is to perform a first operation associated with said multi-execute command, said data structure including an indicator for each of said plurality of processors indicating whether said each processor is to perform said first operation;
- machine executable code for forwarding said multi-execute command to a second processor in a second data storage entity; and
- machine executable code for determining, in accordance with said data structure, whether the second processor is to perform said first operation associated with said multi-execute command.

15. The computer program product of claim 14, wherein a second operation is associated with said multi-execute command, said data structure including a second indicator for each processor indicating whether said each processor is to perform said second operation.

16. The computer program product of claim 14, wherein at least one of said first and said second data storage entities includes a shared memory, said shared memory being used for communicating data associated with the multi-execute command between two processors in said at least one of said data storage entities.

17. The computer program product of claim 16, wherein said data includes at least one of: an input parameter, an output parameter, and status information.

18. The computer program product of claim 17, wherein said status information includes data used in error processing and tracking.

19. The computer program product of claim 14, further comprising:
- machine executable code for performing said first operation using at least one of said first processor and said second processor.

20. The computer program product of claim 14, further comprising:
- a data structure indicating which processors included in said computer system perform said first operation associated with said multi-execute command.

21. A computer program product implemented on tangible media for performing an operation on a plurality of processors in a computer system comprising:
- machine executable code for issuing a multi-execute command by a host system to a first processor in a first data storage entity connected to the host system, said multi-execute command being a single system call indicating which processors perform at least one operation;
- machine executable code for determining whether the first processor is to perform a first operation associated with said multi-execute command;
- machine executable code for forwarding said multi-execute command to a second processor in a second data storage entity; and
- machine executable code for determining whether the second processor is to perform said first operation associated with said multi-execute command;

a data structure indicating which processors included in said computer system perform said first operation associated with said multi-execute command;

machine executable code for determining a path of said multi-execute command, said path including said first and said second processors, said path defining a portion of the processors in said computer system that are forwarded said multi-execute command, said portion including at least two processors; and wherein said data structure is a bit vector having an entry associated with a corresponding processor included in said portion, each entry in said bit vector having a value of 1 if said corresponding processor is to perform said first operation, and a value of 0 otherwise.

22. The computer program product of claim 21, wherein said multi-execute command is used to indicate whether each of the processors included in said portion is to perform a plurality of operations, said plurality of operations including said first operation and a second operation different from the first operation; and wherein said bit vector is a first bit vector and said data structure includes a second bit vector having an entry associated with a corresponding processor included in said portion, each entry in said second bit vector having a value of 1 if said corresponding processor is to perform said second operation, and a value of 0 otherwise.

23. The computer program product of claim 22, wherein said multi-execute command causes an operation to be performed by a processor in one of a forward path direction and return path direction, said forward path direction being defined as forwarding said multi-execute command from said first processor to an end processor, said return path direction being defined as forwarding said multi-execute command from said end processor to said first processor.

24. The computer program product of claim 23, further comprising:

machine executable code for performing said first operation on a processor included in said portion in said forward path direction; and machine executable code for performing said second operation on a processor included in said portion in said return path direction.

25. The computer program product of claim 24, further comprising:

machine executable code for indicating in said first bit vector whether a processor in said portion is to perform said first operation in said forward path direction; and machine executable code for indicating in said second bit vector whether a processor in said portion is to perform said second operation in said return path direction.

26. The computer program product of claim 25, wherein said first operation includes enabling communications of an adapter, and said second operation includes disabling communications of an adapter.

27. A system comprising:

at least two data storage entities each including at least one processor;

each of said at least two data storage entities including code that:

receives a multi-execute command, said multi-execute command being a single system call indicating which processors perform at least one operation;

determines, in accordance with a data structure, whether said at least one processor in said each data storage entity is to perform an operation associated with said multi-execute command, said data structure including an indicator for each processor of said at least two data storage entities indicating whether said each processor is to perform said operation; and forwards said multi-execute command to another of said at least two data storage entities connected to said each data storage.

\* \* \* \* \*